(12) United States Patent  (10) Patent No.: US 7,942,049 B2
Fritz et al.  (45) Date of Patent: May 17, 2011

(54) DEVICE FOR AUTOMATIC EVALUATION AND CONTROL OF WIND TUNNEL MEASUREMENTS

(75) Inventors: Soenke Fritz, Hamburg (DE); Rolf-Rainer Grigat, Halstenbek (DE)

(73) Assignee: Airbus Deutschland GmbH, Hamburg (DE)

( * ) Notice: Subject to any disclaimer, the term of this patent is extended or adjusted under 35 U.S.C. 154(b) by 658 days.

(21) Appl. No.: 11/911,235

(22) PCT Filed: Apr. 13, 2006

(86) PCT No.: PCT/EP2006/003443
§ 371 (c)(1), (2), (4) Date: Mar. 20, 2008

(87) PCT Pub. No.: WO2006/108669
PCT Pub. Date: Oct. 19, 2006

(65) Prior Publication Data
US 2010/0064793 A1  Mar. 18, 2010

Related U.S. Application Data

(60) Provisional application No. 60/671,885, filed on Apr. 15, 2005.

(30) Foreign Application Priority Data

Apr. 15, 2005 (DE) .......................... 10 2005 017 515

(51) Int. Cl.
*G01M 9/00*  (2006.01)
(52) U.S. Cl. ........................................... 73/147
(58) Field of Classification Search .................. None
See application file for complete search history.

(56) References Cited

U.S. PATENT DOCUMENTS

| 4,845,993 | A | * | 7/1989 | Horne et al. .................. 73/147 |
| 5,045,699 | A | | 9/1991 | Schulze et al. |
| 5,748,311 | A | | 5/1998 | Hamann et al. |
| 2002/0176606 | A1 | | 11/2002 | Wernet et al. |
| 2006/0137439 | A1 | * | 6/2006 | Mallebay-Vacqueur et al. .................. 73/147 |

FOREIGN PATENT DOCUMENTS

| DE | 19629790 A1 | 5/1998 |
| JP | 60170737 A | 9/1985 |
| JP | 8-114526 | 5/1996 |
| JP | 9-54010 | 2/1997 |
| JP | 9229814 A | 9/1997 |
| JP | 10-307074 | 11/1998 |
| JP | 2000-346740 | 12/2000 |
| JP | 2002-277346 | 9/2002 |
| WO | 2005/022109 A1 | 3/2005 |

OTHER PUBLICATIONS

Russian Notice of Allowance dated Jul. 15, 2010, No. 2007139984/28(043775).

* cited by examiner

*Primary Examiner* — Andre J Allen
(74) *Attorney, Agent, or Firm* — Christopher Paradies; Fowler White Boggs P.A.

(57) ABSTRACT

A device for evaluating a wind tunnel measurement, in which a processor identifies a flow element on an image recorded in the wind tunnel. The identified flow element subsequently may be segmented and further analyzed in order to obtain accurate information about the flow behaviour of an object to be analyzed. In addition, a method, a computer-readable storage medium, a program element, and an arrangement are disclosed.

33 Claims, 1 Drawing Sheet

DEVICE FOR AUTOMATIC EVALUATION AND CONTROL OF WIND TUNNEL MEASUREMENTS

This application claims the benefit of the filing date of U.S. Provisional Patent Application No. 60/671,885 filed Apr. 15, 2005 and of German Patent Application No. 10 2005 017 515.5 filed Apr. 15, 2005 the disclosures of which are hereby incorporated herein by reference.

FIELD OF THE INVENTION

The field relates to a device, an arrangement, and a method for evaluating wind tunnel measurements, a computer-readable storage medium, and a program element.

BACKGROUND OF THE INVENTION

With the development of new aircraft generations, the aerodynamic properties first are optimized on models, based on measurements in a wind tunnel. In this regard, numerous filaments of a few centimeters long are attached with a filament end to the model, so that by monitoring the filaments in the wind current, the flow state and the flow direction at the location of the filaments may be determined.

There are roughly three states, specifically, "undisturbed" (or laminar), "disturbed" (turbulent), and "detached". If the flow lies in the area of a filament on the model surface, then the flow is undisturbed. The filament remains extended (laminar barrier layer) and displays the local direction of the surface flow. From the impact point, the free filament end begins to quiver, the flow is disturbed (turbulent barrier layer). Small, beginning disturbances of the surface flow lead to "quivering" movements of the free filament ends. At the detachment point, the flow rises from the surface (detached flow) and surface currents form that are intensely swirling to back-flowing (counter to the primary flow direction). The filament moves so quickly in all of its spatial degrees of freedom in such an area that only the attached fiber head may be perceived visually.

Until now, the filament images typically are evaluated manually. In this regard, video recordings are taken during the wind tunnel measurements and manually evaluated. In the selected recordings and associated concept sketches, the boundary lines between the areas of undisturbed, disturbed, and detached flow are designated by the user.

SUMMARY OF THE INVENTION

There may be a need to improve evaluation of wind tunnel measurements.

In one example, a device, an arrangement, and a method for evaluating a wind tunnel measurement, by a computer-readable storage medium, and by a program element for evaluating a wind tunnel measurement with various features claimed, provides a solution.

In one example, device for evaluating a wind tunnel measurement is provided. The device includes a processor, which is equipped such that with it, the method step of automatically identifying at least one flow element on an image recorded during the wind tunnel measurement may be performed.

In one example, a method for evaluating a wind tunnel measurement is provided. With the method, by a process, at least one flow element is identified on an image recorded during the wind tunnel measurement, for example, in the wind tunnel.

In one example, a computer-readable storage medium is provided, in which a program for evaluating a wind tunnel measurement is stored, which, with performance on a processor, automatically identifies at least one flow element on an image recorded during the wind tunnel measurement, and optionally, processes the image of the at least one flow element and/or an object, to which the at least one flow element may be attached.

In one example, a program element for evaluating a wind tunnel measurement is provided, which, when it is performed by a processor, identifies a flow element on an image recorded during the wind tunnel measurement, and optionally, processes the image of the at least one flow element and/or an object.

In one example, a computer program, that is software, as well as by one or more specialized electrical circuits, that is, hardware or in any hybrid form, that is, by software components and hardware components.

In one example, an arrangement for performing a wind tunnel measurement with an object disposed in a wind tunnel, with a recording device for recording an image, and with a device with the above-described features, is provided.

In one example, a flow element mounted to an object to be analyzed and located in the wind tunnel may be automatically identified and/or segmented. Based on this identification and/or segmenting of the flow element or flow elements, subsequent further calculations, simulations, or processing may be conducted automatically. In this manner, a reliable statistic may be prepared about many recordings with constant trial conditions in a time-saving manner, so that not just random samplings may be measured, which generally are subject to large dispersions.

An automatic evaluation of a wind tunnel measurement may be performed with very little expenditure of time, and in particular, a very detailed evaluation during a running measurement (for example, also in real time) may be performed. With the possibility of performing multiple measurements and simultaneous evaluations, measurement dispersions and errors may be reduced or minimized.

In addition, in one example, evaluations with different parameter sets may be performed and characteristic lines may be prepared as a function of different parameters, whereby the expenditure of time and the likelihood of error may be reduced.

In one example, the wind tunnel measurement and its evaluation may take place on an aircraft or an aircraft model, so that in particular, with the development of new aircraft technologies, the flow properties of the aircraft may be verified, improved or optimized.

Under the term "flow element", in particular, a physical article having typically smaller dimensions compared with the object to be analyzed, is to be understood, which article may be attached to the object. If this type of flow element is exposed to a flow (for example, in a wind tunnel), it is effected by this flow and therefore may serve to characterized the flow behaviours in its surrounding region. Such a flow element may be realized, for example, as filaments.

According to a further embodiment of the device, the device further includes a (optical) recording device, whereby with the at least one recording device, an image of the at least one flow element on an object to be analyzed may be recorded.

According to an exemplary example, the device further includes a display device for displaying the recorded image of the at least one flow element and/or the object.

According to one example, the at least one flow element has a different color relative to the object to be analyzed, in order to make possible a fast and certain identification and segmentation on the recorded image.

According to a further example, at least two flow elements have different physical properties (for example, stiffness, diameter, surface structure). In this manner, the information content of a measurement may be increased, for example, by comparing the behaviour of the different flow elements in the current.

According to an example, the device further includes two or more recording devices, in order therefore to represent three-dimensionally or spatially the object to be analyzed and/or the at least one flow element. With a steric representation, the information content of the measurement may be increased and the results may be shown to the user clearly and in a desired perspective.

According to an exemplary example, a color camera is provided for the recording device, in order for the at least one flow element and/or the object to be broken down into colors and thereby, to be identified or segmented better.

According to an example, a high speed camera may be used, in order to have available multiple, evaluatable image recordings per unit time. For example, the movement of the flow elements may be followed better.

According to an example, the processor may be formed for processing interlace video sequences, whereby the movement of a flow element may be evaluated even better.

In one example, a process identifies and/or segments the at least one flow element from the surroundings or from the object to be analyzed by a recorded image of the at least one flow element and/or the object to be analyzed based on different color shades.

In an example of the method, the image of the at least one flow element and/or the object may be saved (for example, on a storage medium), so that it is available for further analysis.

In a further step of the method, geometric properties of the at least one flow element may be computed on the recorded image. Thus, it is possible, if necessary, to represent the development of the flow behaviour of the at least one flow element as a continuous function.

In a further example of the method, based on physical properties of the at least one flow element, the information content of the measurement is increased. The at least one flow element may have predetermined physical properties, such as for example, a determined color shade, a determined luminance, a determined saturation, a determined stiffness or rigidity, a determined diameter, or a determined surface structure. Thus, it is possible, for example, by comparing two flow elements with different physical properties, to draw conclusions about the flow behaviour.

According to a further example of the method, geometric properties of the at lest one flow element are calculated based on the recorded image of the at least one flow element. Thus, for example, the center of gravity, the surface area, the axial ratio, and the direction of the flow element may be calculated. Therefore, for example, the centre of gravity describes a determined filament position and the direction a specific orientation of the filament. The surface area and the axial ratio frequently contain information as to whether the filament is extended or performs fast movements.

According to an example of the method, the distance of the flow elements to the object to be analyzed may be constant, so that a periodic pattern of the flow elements is provided, whereby one may identify and/or segment the flow elements better and more clearly by Fourier analysis and geometric transformation.

According to an example of the method, at least two successive partial images are recorded by a recording device by the interlace method and based on the image formation speed of the partial images, the speed of movements of the at least one flow element are measured.

According to an example of the method, an object is subdivided into Voronoi cells, in the center of which a respective flow element is located. Thus, the flow properties of the flow element disposed in the center are transmitted to the entire cell.

According to an example of the method, by multiple recording device, the at least one flow element and/or the object to be analyzed are represented three-dimensionally.

According to another example of the method, the object to be analyzed may be moved directly in the wind tunnel by an input device and/or may be controlled by input of determined control parameters. These control parameters may be, for example, the angle of incidence, the yaw angle, or the roll angle of the object or different flow parameters.

According to a further example of the method, a determined monitoring state of the object to be analyzed or of the at least one flow element may be provided and the control parameters and/or the orientation of the object to be analyzed or the flow of the wind channel may be adjusted automatically. If the user desires a state, for example, in which the flow is detached, then he provides this condition for one region, whereby the control parameters and the model orientation are automatically calculated and adjusted.

According to an example of the method, the position of a flow element may be calculated by geometric transformation. If the corresponding positions of one or more, for example, of at least four, flow elements of an adjacent flow element are known, then the geometric properties may be calculated by geometric transformation (homography).

According to an example of the program-element, the at least one flow element is represented according to its geometric and/or physical properties, for example, by specific color shades.

In an example of the program element, the transition of a flow state or the change of the geometric and/or physical properties of the flow elements therefore may be adjusted as a continuous transition.

According to another example of the program element, the object to be analyzed may be subdivided into Voronoi cells, in the center of which a respective flow element is located. Each Voronoi cell may represent the flow element mounted in the center. The Voronoi cells may be dyed with a discrete or continuous series of colors according to the geometric and/or physical properties of the flow elements.

According to another example of the method, the area between the flow elements may be represented by interpolation with continuous color transition. Thus, the change of the different properties of the flow elements may be clearly shown.

In an example of the program element, the at least one flow element may be shown separately and/or combined with the object to be analyzed. Thus, with a separate representation, calculations may be performed better and with a combined representation of a user, the results may be represented more clearly.

According to a further example of the program element, for visualization of the at least one flow element and/or the object, auxiliary information may be added in, which is not provided at the object to be analyzed or in the flow properties of the wind tunnel. This auxiliary information may be determined flow lines, determined pressure distributions, concealed recorded features on the object to be analyzed, such as for example, engine beams or high lift aids.

According to an exemplary example of the program element, multiple individual measurements may be evaluated with the same control parameters and different object configurations. Thus, the user may analyze the different object configurations, such as for example, different engine diameters, with the same environmental conditions.

According to an exemplary example of the program element, the individual measurements may be evaluated statistically with the same or different control parameters and the same or different object configurations. If one evaluates the individual measurements with the same parameters and the same object configurations, an adjustable error threshold may be determined by the program element. Thus, first with regions of a determined number of valid measurements, the measurement is continued with other parameters and/or object configurations. This may run automatically. In this manner, the measurement may be much more reliable, so that error recordings or error calculations may be equalized.

According to an example of the program element, the increments of the parameter of the measurement may be changed controllably, so that the user, for example with critical transitions, for example from turbulent to detached current, may adjust the increments better in order to obtain frequent measurements. With the program element, likewise, a hysteresis curve may be determined automatically by continuous image evaluation.

According to an example, the arrangement further may have an attachment means for attaching the flow elements to an object to be analyzed in the wind tunnel. This attachment means therefore may be an adhesive strip, which has different color shades compared with the at least one flow element.

According to an example, the arrangement further includes an input device (for example, a graphical user interface), with which the object to be analyzed may be controlled and/or may be input with the parameters. The flow elements may comprise, for example, filaments or needles, which may be attached flexibly to an object to be analyzed.

The examples of the device and/or the arrangement apply also for the method, the computer-readable storage medium, and the program element, and vice versa.

BRIEF DESCRIPTION OF THE FIGURES

Next, for further clarification and better understanding of the device, the embodiments will be described in greater detail with reference to the accompany drawing.

DETAILED DESCRIPTION

Figure 1:
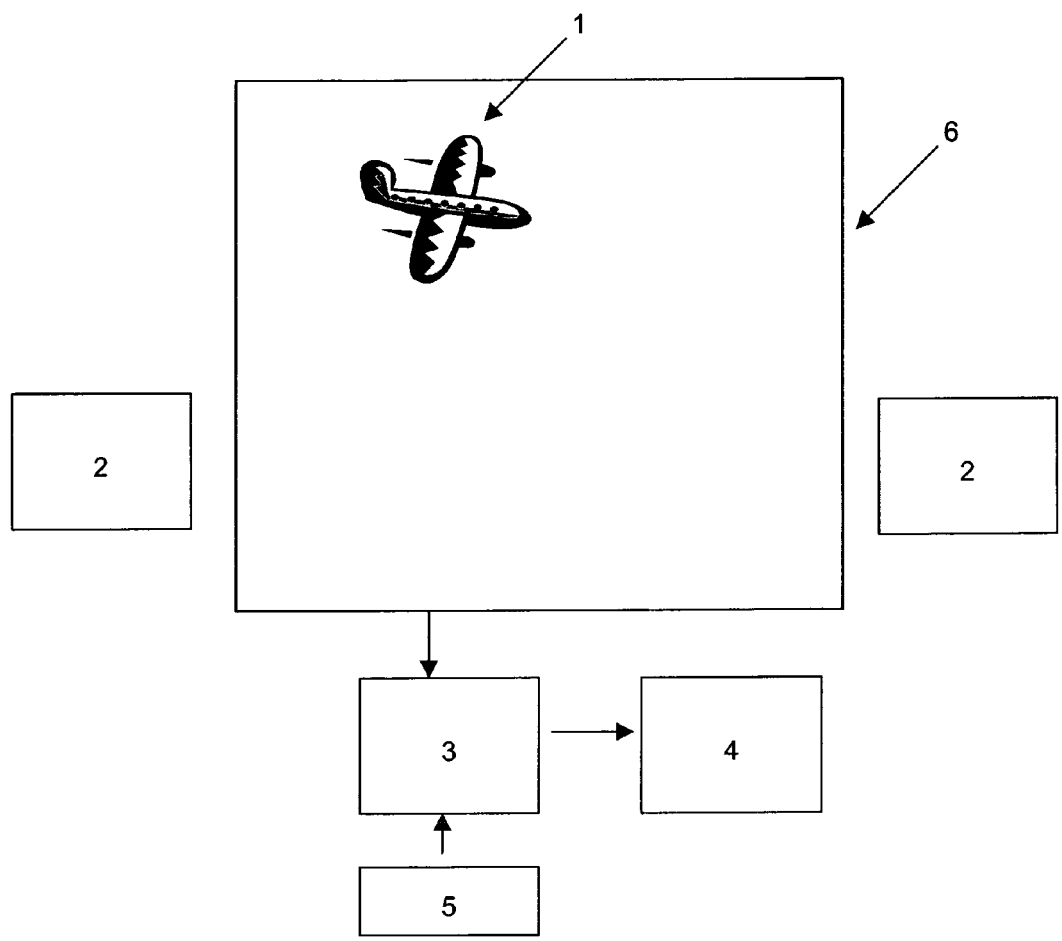
FIG. 1 shows a schematic representation of an arrangement according to one example.

The examples described and drawings rendered are illustrative and are not to be read as limiting the scope of the invention as it is defined by the appended claims. The representation in the FIGURE is schematic and not to scale.

FIG. 1 shows an arrangement for performing a wind tunnel measurement according to an embodiment of the device.

The arrangement includes a wind tunnel 6, in which an object to be analyzed 1 (for example, a scaled-down model of an aircraft) is disposed. The recording devices 2 (for example, cameras) are located in a normal case outside of the wind tunnel in order not to disturb the flow/current. The images recorded by the recording devices 2 are sent to a processor 3 (for example, a microprocessor of a computer). Via an input device 5, determined parameters for the wind tunnel measurement or the evaluation may be inputted by a user. The results obtained from the images may be made visible on a display device 4 (for example a monitor) to a user.

With analysis of flow properties of the object to be analyzed 1, flow elements (not shown) in the form of filaments are adhered to the surface of the object 1.

If the flow contacts the object 1 in an ideal manner, then the filaments lie flat on the surface of the object 1. In the case of a flow interruption, the filaments move away from the surface and "flutter" in space.

A goal of the analysis of the device is to enable processing of the filaments and their properties on the processor 3 in order to determine faster and more accurately the properties of the object to be analyzed 1. Thus, the recording units 2 record the object 1 to be analyzed as well as the filaments located thereon during a flow trial, that is, a wind tunnel measurement. Subsequently, the image so recorded is analyzed with the processor 3 by the image processing, and the filaments are identified and/or segmented and stored as a separate image on a computer hard drive.

The recording devices 2 may be color cameras (for example, a CCD or a CMOS color camera), which may distinguish a plurality of colors. This may lead to an increase of the information density of the image recording. The filament heads are inserted in an adhesive strip, and the adhesive strip is adhered then to the model 1. If one selects a different color for the adhesive strip than for the filaments, the filament heads are clearly much more robustly identifiable in color recordings.

In addition, one may select different physical properties for the filaments, such as stiffness, diameter, or surface structure, for example, and in addition to the defined filament color, obtain a high information content of a measurement. If one uses filaments with a small diameter; for example, or a smooth surface structure, the flow on the object 1 is hardly disturbed and the quality of the measurement is greatly increased.

The recorded image of the object 1 and the filaments are processed further during the measurement or subsequently. Thus, it is advantageous if the filaments are segmented from the object 1 in order to characterize subsequently the properties of the filaments and therewith, the properties of the flow. For that purpose, first, the exact geometric filament position is determined.

According to the device, the processor 3 identifies the filament position on the recorded image, based, for example, on the hue, the luminance, or the saturation of the filament in the image and subsequently may segment this filament.

Based on this segmented filament image, now, the geometric features of the filament may be calculated. From the filament image, for example, the position of the center of gravity, the surface area, the axial ratio, and the direction of the filament may be identified. For example, the center of gravity describes the filament position, the direction describes the orientation of the filament, and the surface area and the axial ratio describe whether the filament is extended or performs fast movements.

In order to locate the filament more quickly and reliably, the filaments may be inserted with constant distance into the adhesive strip so that a periodic filament pattern is formed, and so that by Fourier analysis and the combination with geometric transformation even these filaments are located more quickly and reliably.

In order to better parameterize the filaments, the possibility exists of determining the filament speed by interlace video sequences. An interlace complete image comprises two partial images, whereby the first partial image contains the odd lines and the second partial image contains the even lines of the complete image. These partial images are recorded in a defined temporal distance, so that the first partial image of the filament records at a determined position and the second partial image records the same filament at a different position. When the distance covered is recognized in a defined time point, then the speed of movements may be determined. To minimize measurement errors, it was determined that the sampling theorem may be followed.

The now identified and parameterized filaments furthermore may be graphically represented by a user and immediately or subsequently may be processed. For this purpose, by a computer program, the filaments are represented in color according to determined filament states (undisturbed, disturbed, detached), for example "green" for undisturbed filaments, "yellow" for disturbed filaments, and "red" for detached filaments.

The hues of the filaments may be displayed in the representation accordingly as a function of the geometric features, for example, center of gravity, surface area, axial ratio, or direction, so that the transition between the flow states may be identified as continuous transitions. This permits a substantially differentiated visual analysis as the discrete representation.

Alternatively, the graphical representation of the analyzed object (for example, a model of an aircraft) may be subdivided into so-called Voronoi cells. In each Voronoi cell, a filament is located, which is arranged in the center of its Voronoi cell. Each Voronoi cell contains those points, which are denser in the center of this cell in the sense of a predetermined measure than in the centres of all of the other cells. The Voronoi cells cover the graphic representation completely, without overlapping. The Voronoi cells are colored according to the properties of the filament in their centre point, so that via the object to be analyzed 1, the flow behaviour is reflected completely.

Other than with the Voronoi cells, the areas between the filaments also may be represented by interpolation of continuous hue transitions, so that a continuous representation exists.

By the graphic representation, in addition to the parameterized filaments, also the true representation of the analyzed object 1 may be superimposed, so that the position of the filaments on this object may be identified directly. In the case of multiple recording devices, it is possible to provide to the user this visualization three-dimensionally, so that he obtains a direct, spatial impression of the analyzed filament flows.

In this visualization, in addition, also computed data such as, for example, flow lines, pressure distributions or optically screened constructive features, such as for example, the beams from engines, may be included. Thus, a flow behaviour of an additional or imaginary provided object 1 may be simulated.

In addition, the possibility exists of comparing different measurements. For each filament, on the one hand, a deviation with the same parameter settings may be visualized and on the other hand, for example, the effect of engines with wing models. Also the boundary lines between different flow states may be analyzed as a function of the angle of incidence of the analyzed wings.

In addition, the device makes possible the combination of numerous individual measurements with the same parameter set, so that statistically significant statements may be calculated. For example, the duration and the number of a measurement may be controlled, such that the respective error limit of a selected threshold must be undershot before the measurement is continued with another configuration. The statistically stored data could then serve for compiling objective flow images (flow maps).

Furthermore, the increments of the parameters, for example, the angle of incidence, may be controlled, such that the increments are adaptively minimized with flow conditions of interest, in order to obtain the most detailed measurement as possible.

In addition, also the reversal process between flow states may be analyzed, in which for example, the oscillating behaviour of the flow states with a constant parameter set is analyzed. With periodic exceeding of the limits in which a flow state changes, the possibility exists for determining automatically hysteresis curves by continuous image evaluation, among other things.

In the arrangement of FIG. 1, likewise the possibility exists of effecting via an input device 5 interactive analyses in special flow situations. In this connection, one may select and analyze an area of the trial object 1 with the input device 5 (for example, a computer mouse and/or keyboard). For example, one may mark the desired area of the trial object 1 and provide a desired flow behaviour (for example, between disturbed and detached flow), whereupon the device changes the angle of incidence or other control parameters of the object 1, such that for the selected object region, the desired monitoring state occurs.

At this point, it is also possible to perform the experiment manually, in which the parameter of the model or the wind tunnel are changed via the input device.

In addition, the orientation or the shape of the object, as well as the flow properties of the wind tunnel, may be changed via the input device, so that, for example, the mach number may be changed or flaps of the high lift aids may be retracted or extended.

Further, the possibility exists of minimizing the occurrence of measurement errors. This so-called geometric correction is possible, in that proximity relationships of the filaments are used. If, for example, a filament is not correctly identified, so that no statement about the flow state at this point of this filament may be identified, then one calculates via geometric transformation of the adjacent and error-free determined filament the geometric properties of the imprecisely measured filament.

Additionally, it should be noted that "including" does not exclude other elements or steps and "a" or "one" does not excluded a plurality. In addition, it should be noted that features or steps, which were described with reference to one of the above embodiments, also may be used in combination with other features or steps of other embodiments described above. Reference numerals in the claims are not to be viewed as limitations.

Alternative combinations and variations of the examples provided will become apparent based on the disclosure. It is not possible to provide specific examples for all of the many possible combinations and variations of the embodiments described, but such combinations and variations may be claims that eventually issue.

What is claimed:

1. A method for evaluating a wind tunnel measurement, comprising:
   automatically identifying at least one flow element on an image recorded during the wind tunnel measurement; and
   calculating geometric properties of the at least one flow element based on the image of the at least one flow element.

2. The method according to claim 1, further comprising:
providing a processor for identifying or segmenting the at least one flow element by the recorded image based on color shades of the at least one flow element or both identifying and segmenting the at least one flow element.

3. The method according to claim 1, further comprising:
calculating a trend of a flow behaviour of the at least one flow element as a continuous function.

4. The method according claim 1, further comprising:
evaluating the wind tunnel measurement by taking into consideration different physical properties of different flow elements.

5. The method according to claim 4, further comprising:
selecting the different physical properties of the flow element from a group consisting of hue, luminance, saturation, stiffness, diameter, and surface structure.

6. The method according to claim 1, further comprising:
selecting the geometric properties of the at least one flow element from a group of geometric properties consisting of a center of gravity, an area, an axial ratio, and a direction of the at least one flow element.

7. The method according claim 1, further comprising:
identifying by a Fourier analysis or a geometric transformation, the at least one flow element, or both identifying by the Fourier analysis and the geometric transformation the at least one flow element.

8. The method according to claim 1, further comprising:
recording, according to an interlace method, at least two partial images, and measuring, based on the at least two partial images, a movement of the at least one flow element.

9. The method according to claim 1, further comprising:
subdividing an object on the image into Voronoi cells, so that in a center of one of the Voronoi cells, a respective flow element is located.

10. The method according to claim 1, further comprising:
providing a determined monitoring state of the at least one flow element; and adjusting automatic control parameters or an orientation of an object to be analyzed or both adjusting automatic control parameters and orientation of an object to be analyzed.

11. The method according to claim 1, further comprising:
calculating by using geometric transformation, a position of the at least one flow element.

12. A computer-readable storage medium in which a program for evaluating a wind tunnel measurement is stored, wherein the program, when it is performed by a processor, performs or controls the following method steps:
automatically identifying at least one flow element on an image recorded during the wind tunnel measurement; and
calculating geometric properties of the at least one flow element based on the image of the at least one flow element.

13. A computer-readable storage medium according to claim 12, wherein the image of the at least one flow element is processed by the program.

14. A program element for evaluating a wind tunnel measurement, which, when it is performed by a processor, performs or controls the following method steps:
automatically identifying at least one flow element on an image recorded during the wind tunnel measurement; and
calculating geometric properties of the at least one flow element based on the image of the at least one flow element.

15. The program element according to claim 14, further comprising:
representing the at least one flow element according to its geometric properties or physical properties or both geometric and physical properties in determined color hues.

16. The program element according to claim 14, further comprising:
showing a transition of a flow state as a continuous transition.

17. The program element according to claim 15, further comprising subdividing an object into Voronoi cells, so that in a center of one of the Voronoi cells, a respective flow element is located, and dying the Voronoi cells with the determined color hues providing discrete color hues or continuous series of color hues according to the geometric or physical properties of the flow elements or both the geometric and physical properties of the at least one flow element.

18. The program element according to claim 14, further comprising:
representing a region between different ones of the at least one flow element by interpolation with continuous color transitions.

19. The program element according to claim 17, further comprising:
representing the at least one flow element or representing the at least flow element and the object to be analyzed, or combinations thereof.

20. The program element according to claim 17, further comprising:
taking into account auxiliary information with a visualization of the at least one flow element or the object, or both the at least one flow element and the object; and selecting the auxiliary information from a group consisting of flow lines, pressure distribution, optically concealed constructive features and engine beams.

21. The program element according to claim 17, further comprising:
selecting control parameters for the wind tunnel measurement; and
evaluating a plurality of individual measurements of the image with the same control parameters and differing configurations of the object.

22. The program element according to claim 17, further comprising:
Selecting control parameters for the wind tunnel measurement; and
evaluating a plurality of individual measurements of the image statistically with the same control parameters and the same configuration of the object.

23. The program element according to claim 22, further comprising:
continuing, upon exceeding an adjustable error threshold, the plurality of individual measurements of the image automatically with other control parameters and other configurations of the object.

24. An arrangement for performing a wind tunnel measurement, comprising an object arranged in a wind tunnel, a recording device for recording an image during the wind tunnel measurement, and a device for evaluating the wind tunnel measurement, the device comprising a processor, for performing
automatic identification of at least one flow element on an image recorded during the wind tunnel measurement; and
calculating geometric properties of the at least one flow element based on the image of the at least one flow element.

25. The arrangement according to claim 24,
wherein the at least one flow element is attached to the object.

26. The arrangement according to claim 25, wherein an attachment structure for attaching the at least one flow element to the object is an adhesive strip, and the adhesive strip and the at least one flow element have different colors.

27. The arrangement according to claim 24, further comprising:
an input device for direct control of the object to be analyzed or for inputting parameters or for both direct control of the object to be analyzed and for inputting parameters.

28. The arrangement according to claim 27, wherein the parameters are selected from a group consisting of an angle of incidence of the object, flow parameters, a yaw angle of the object, and an angle of roll of the object.

29. The arrangement according to claim 25, whereby the at least one flow element has different colors as compared with the object.

30. The arrangement according to claim 24, further comprising:
wherein the at least one flow element includes at least two flow elements, which have different physical properties.

31. The arrangement according to claim 24, wherein the object is an aircraft or an aircraft model.

32. The method of claim 5, wherein the step of selecting the different physical properties of the flow element selects a first hue for the at least one flow element and a second hue, different than the first hue, for an adhesive strip in which a filament head of the at least one flow element is inserted.

33. The method of claim 32, wherein the step of selecting the different physical properties further selects the physical properties of the at least one flow element from the group consisting of a stiffness, a diameter, and a surface structure.

* * * * *